(12) United States Patent
Chang

(10) Patent No.: US 12,059,619 B2
(45) Date of Patent: Aug. 13, 2024

(54) INFORMATION PROCESSING METHOD AND APPARATUS, COMPUTER READABLE STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Tianyuan Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 243 days.

(21) Appl. No.: 17/679,620

(22) Filed: Feb. 24, 2022

(65) Prior Publication Data

US 2022/0176248 A1  Jun. 9, 2022

Related U.S. Application Data

(63) Continuation of application No. PCT/CN2020/127092, filed on Nov. 6, 2020.

(30) Foreign Application Priority Data

Feb. 11, 2020 (CN) .......................... 202010086291.6

(51) Int. Cl.
  *A63F 13/56* (2014.01)
  *A63F 13/45* (2014.01)
  *G06N 20/00* (2019.01)

(52) U.S. Cl.
  CPC .............. *A63F 13/56* (2014.09); *A63F 13/45* (2014.09); *G06N 20/00* (2019.01)

(58) Field of Classification Search
  None
  See application file for complete search history.

(56) References Cited

U.S. PATENT DOCUMENTS

2003/0069052 A1* 4/2003 Higashiyama .......... A63F 13/45
                                                                      463/4
2017/0286860 A1* 10/2017 Chen ........................ G06N 3/08
2018/0104585 A1     4/2018 Dawson et al.

FOREIGN PATENT DOCUMENTS

CN    105435450 A    3/2016
CN    107890675 A    4/2018
(Continued)

OTHER PUBLICATIONS

International Search Report with English translation and Written Opinion regarding PCT/CN2020/127092 dated Feb. 18, 2021, 10 pages.

(Continued)

*Primary Examiner* — Kevin Y Kim
(74) *Attorney, Agent, or Firm* — Crowell & Moring LLP

(57) ABSTRACT

Embodiments of this application relate to the field of artificial intelligence technologies, and in particular, to an information processing method, an information processing apparatus, a computer readable storage medium, and an electronic device. The information processing method includes: determining, by a device, a subject in a game scenario, and acquiring an action model used for controlling the subject to execute a game action; performing, by the device, feature extraction on the game scenario to obtain model game state information related to the subject; performing, by the device, mapping processing on the model game state information by using the action model, to obtain model game action selection information corresponding to at least two candidate game actions; and selecting, by the device according to the model game action selection information, a model game action for the subject from the at least two candidate game actions.

17 Claims, 12 Drawing Sheets

(56) References Cited

FOREIGN PATENT DOCUMENTS

| | | |
|---|---|---|
| CN | 108283809 A | 7/2018 |
| CN | 110163378 A | 8/2019 |
| CN | 111282267 A | 6/2020 |
| JP | 2013-252247 A | 12/2013 |
| JP | 2018-063602 A | 4/2018 |
| JP | 2019-195512 A | 11/2019 |

OTHER PUBLICATIONS

Japanese Office Action with English translation regarding 2022-523836 dated May 10, 2023.

Introduction of "Adversarial Inverse Reinforcement Learning," with English translation, a Technology for AI to Acquire Expert Skills, GMO Inter Net Group Group Research and Development Headquarters (Next Generation Systems Laboratory), Oct. 11, 2018, 26 pages, Retrieved from the Internet: https://recruit.gmo.jp/engineer/jisedai/blog/airl_with_open_ai_gym/>.

Tomohiro Kodaka, "Textbook of Artificial Intelligence to Learn from the Basics," with English abstract, 1st Edition, Ohmsha Co., Ltd. (in Japanese) Kazuo Murakami), Sep. 25, 2019, 7 pages.

Korean Offcie Action with English summary regarding 10-2022-7016867 dated May 13, 2024, 13 pages.

* cited by examiner

INFORMATION PROCESSING METHOD AND APPARATUS, COMPUTER READABLE STORAGE MEDIUM, AND ELECTRONIC DEVICE

RELATED APPLICATION

This application is a continuation application of PCT Patent Application No. PCT/CN2020/127092, filed on Nov. 6, 2020, which claims priority to Chinese Patent Application No. 202010086291.6 filed on Feb. 11, 2020, both of which are incorporated herein by reference in their entireties.

FIELD OF THE TECHNOLOGY

This application relates to the field of artificial intelligence technologies, and relates to machine learning technologies, and in particular, to an information processing method, an information processing apparatus, a computer readable storage medium, and an electronic device.

BACKGROUND OF THE DISCLOSURE

In a video game, game artificial intelligence (AI) that can imitate a human game action is generally configured. The game AI may be used as a virtual player to interact with a real game user in a game process, may also help the user understand a game rule or provide a game decision suggestion for the user in the game process, and may be further used for automate testing of the video game.

With the development of the video game industry, types and a quantity of game content elements in the video game become more and more, and a game environment state becomes more and more complex. When the game AI is faced with diversified and increasingly complex game content and game environments, it is difficult to make a game action decision that meets a real user action habit or meets a user expectation. Therefore, a problem such as a low intelligence level and a poor decision-making capability is generally presented.

The present disclosure describes various embodiments addressing at least one of the problems/issues discussed above, improving efficiency and/or intelligent level of decision-making capability in the technology field of game AI.

SUMMARY

Embodiments of this application provide an information processing method, an information processing apparatus, a computer readable storage medium, and an electronic device, which can improve a decision-making capability of game AI, so that the game AI has a higher personification effect and intelligence level.

The present disclosure describes an information processing method. The method includes determining, by a device, a subject in a game scenario, and acquiring an action model used for controlling the subject to execute a game action. The device includes a memory storing instructions and a processor in communication with the memory. The method also includes performing, by the device, feature extraction on the game scenario to obtain model game state information related to the subject; performing, by the device, mapping processing on the model game state information by using the action model, to obtain model game action selection information corresponding to at least two candidate game actions; and selecting, by the device according to the model game action selection information, a model game action for the subject from the at least two candidate game actions.

The present disclosure describes an information processing apparatus. The information processing apparatus includes a memory storing instructions; and a processor in communication with the memory. When the processor executes the instructions, the processor is configured to cause the information processing apparatus to perform: determining a subject in a game scenario, and acquiring an action model used for controlling the subject to execute a game action, performing feature extraction on the game scenario to obtain model game state information related to the subject, performing mapping processing on the model game state information by using the action model, to obtain model game action selection information corresponding to at least two candidate game actions, and selecting, according to the model game action selection information, a model game action for the subject from the at least two candidate game actions.

The present disclosure describes a non-transitory computer-readable storage medium storing computer-readable instructions. The computer-readable instructions, when executed by a processor, are configured to cause the processor to perform: determining a subject in a game scenario, and acquiring an action model used for controlling the subject to execute a game action; performing feature extraction on the game scenario to obtain model game state information related to the subject; performing mapping processing on the model game state information by using the action model, to obtain model game action selection information corresponding to at least two candidate game actions; and selecting, according to the model game action selection information, a model game action for the subject from the at least two candidate game actions.

Another embodiment of this application provides an information processing method, including:

determining a game action subject in a game scenario, and acquiring an action model used for controlling the game action subject to execute a game action;

performing feature extraction on the game scenario to obtain model game state information related to the game action subject;

performing mapping processing on the model game state information by using the action model, to obtain model game action selection information corresponding to at least two candidate game actions; and selecting, according to the model game action selection information, a model game action executed by the game action subject from the at least two candidate game actions.

An embodiment of this application further provides an information processing apparatus, the apparatus including:

a model acquiring module, configured to: determine a game action subject in a game scenario, and acquire an action model used for controlling the game action subject to execute a game action;

a feature extraction module, configured to perform feature extraction on the game scenario to obtain model game state information related to the game action subject;

a mapping processing module, configured to perform mapping processing on the model game state information by using the action model, to obtain model game action selection information corresponding to at least two candidate game actions; and an action selection module, configured to select, according to the model game action selection information, a model game action executed by the game action subject from the at least two candidate game actions.

An embodiment of this application further provides a computer readable storage medium, storing a computer program, the computer program, when executed by a processor, implementing the information processing method in the foregoing technical solutions.

An embodiment of this application further provides an electronic device, the electronic device including: a processor; and a memory, configured to store executable instructions of the processor; the processor being configured to execute the executable instructions to perform the information processing method.

According to the information processing method, the information processing apparatus, the computer readable storage medium, and the electronic device that are provided in the embodiments of this application, a scenario feature is obtained by performing feature extraction on a game scenario, an analysis decision is performed on the scenario feature by using a pre-trained action model, and a model game action executed by a game action subject may be selected from candidate game actions, so as to obtain a game action decision that meets a user expectation. When game AI is configured in a game, a model game action is selected based on a scenario feature of the game, so that the selected model game action is more adaptable to a game scenario, and corresponding model game actions are selected for different game scenarios, thereby enriching game actions implemented by the game AI, greatly improving a decision-making capability of the game AI, enabling the game AI to have a higher personification effect and intelligence level, and further improving human-computer interaction efficiency.

DESCRIPTION OF EMBODIMENTS

Figure 1:
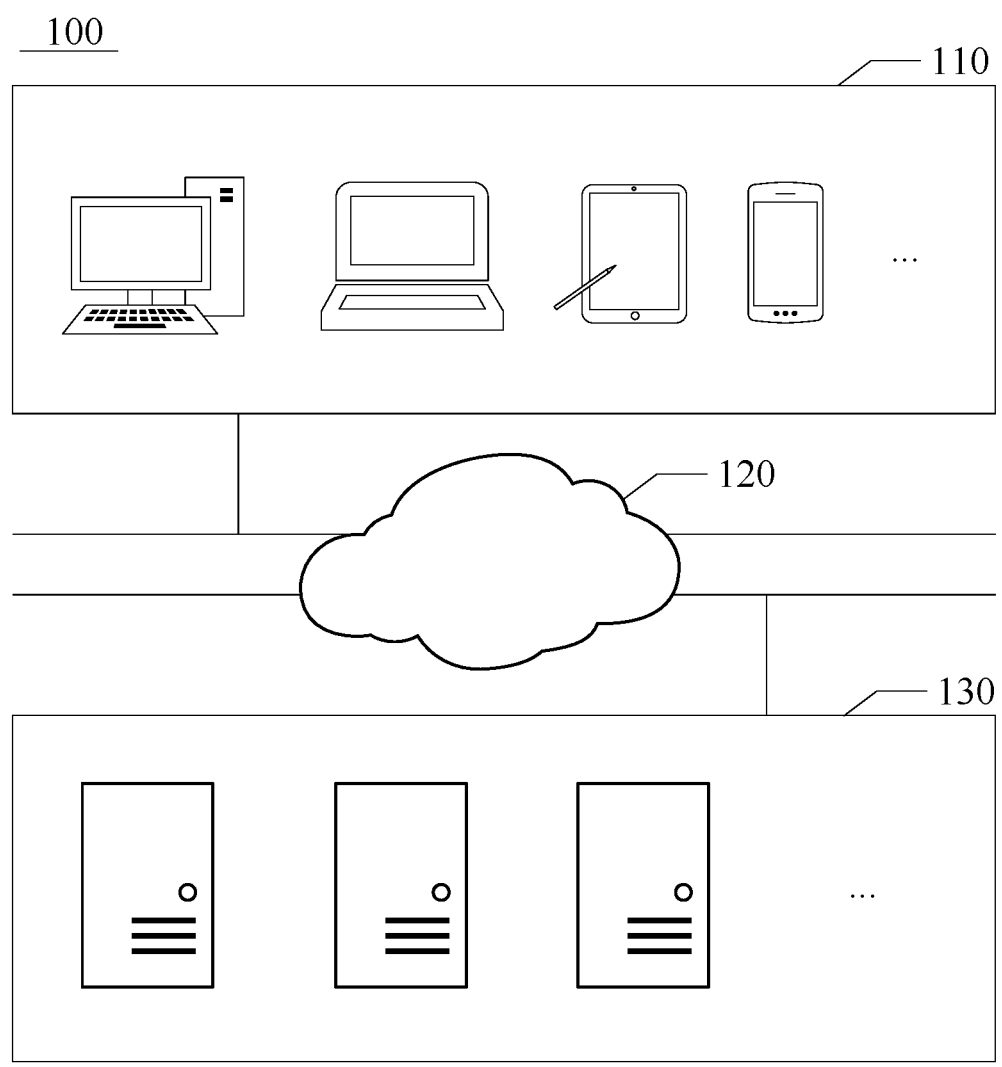
FIG. 1 is a schematic diagram of an exemplary system architecture according to an embodiment of this application.

Exemplary implementations are now described more comprehensively with reference to the accompanying drawings. However, the exemplary implementations can be implemented in various forms and are not construed as being limited to the examples herein. Conversely, such implementations are provided to make embodiments of this application more comprehensive and complete, and fully convey the concepts of the exemplary implementations to a person skilled in the art.

In addition, the described features, structures or characteristics may be combined in one or more embodiments in any appropriate manner. In the following descriptions, a lot of details are provided to give a comprehensive understanding of the embodiments of this application. However, a person skilled in the art will realize that the technical solution of the embodiments of this application can be practiced without one or more specific details, or other methods, components, devices, steps and the like can be adopted. In other cases, public methods, devices, implementations or operations are not shown or described in detail to avoid blurring aspects of the embodiments of this application.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

In a related technology in the art, configuring game AI in a video game based on an artificial intelligence technology has become a common practice in the video game industry. For example, the game AI may provide a user with instructions and guidance of a game rule in a game teaching step, may also provide the user with game decision suggestions in a game process, and may also be used as a virtual player to implement a human-computer fight, or may be used for performing an automated test in a game development process.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

The AI technology is a comprehensive discipline, and relates to a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Training the game AI through machine learning or deep learning may imitate a game decision action of a real user, so as to improve a decision-making capability of the game AI, so that the game AI can make effective decisions that conform to human action logic. However, for some video games with complex and diverse rules, even if a large quantity of training time and computing resources are consumed, it is still difficult to obtain a good training effect.

In an example of a round-robin role play game, most non-player characters (NPC) in some games implement automatic skill release in a manner of establishing a decision tree. A decision tree algorithm establishes a tree structure by selecting related features, and a child node of each parent represents all skill release policies of the node. The technology is limited to small sample data, a game action policy generated is relatively fixed and single, a skill is randomly selected and released, and an intelligence level is low. Therefore, performance of the policy in a training set is relatively good, but performance of the policy in a real game environment is relatively poor, and a serious overfitting phenomenon exists. When the game AI is in a multi-player fight with a real game user, a skill release policy of the game AI, that is, a game action executed by the game AI is usually relatively single and fixed and does not match a current game scenario. As such, the game AI has a low degree of intelligence, and human-computer interaction efficiency is low.

To solve the problem in the foregoing technical solutions, embodiments of this application provide an information processing method, an information processing apparatus, a computer readable storage medium, and an electronic device, which can significantly improve an intelligence level of game AI.

FIG. 1 is a schematic diagram of an exemplary system architecture to which a technical solution of this application is applied.

As shown in FIG. 1, a system architecture 100 may include a client 110, a network 120, and a server 130. The client 110 may include various terminal devices such as a smartphone, a tablet computer, a laptop computer, and a desktop computer. The server 130 may include various server devices such as a network server, an application server, and a database server. The network 120 may be a communication medium capable of providing various connection types of communication links between the client 110 and the server 130, for example, may be a wired communication link or a wireless communication link.

According to an implementation requirement, the system architecture in this embodiment of this application may have any quantity of clients, networks, and servers. In some embodiments, the server 130 may be a server cluster. The server may include, but not limited to, any hardware device that is capable of performing calculation. The server may be an independent physical server, or may be a server cluster or a distributed system including a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. In addition, the technical solution in this embodiment of this application may be applied to the client 110, may be applied to the server 130, or may be jointly implemented by the client 110 and the server 130. This is not specifically limited in this embodiment of this application.

For example, a game application program installed on the client 110 may collect game data of a real game user, and then upload the game data to the server 130 by using the network 120. The server 130 may train a machine learning model based on the received game data, so as to obtain a game AI model that imitates a user game action to make a game decision. The game AI model may make a game decision according to the game data uploaded by the client 110, select a game action (such as a skill release action), and send action selection information to the client 110. The client 110 controls, according to the game action selection information returned by the server 130, a game role in the game application program to implement a corresponding game action.

Figure 2:
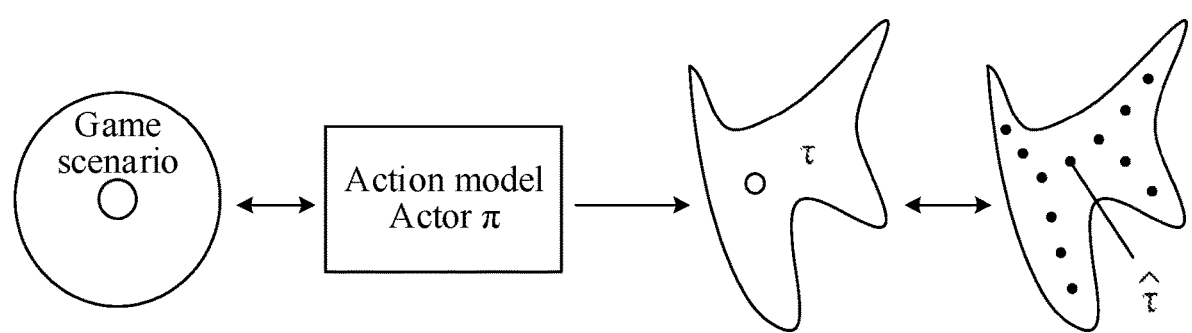
FIG. 2 is a schematic diagram of a principle of generative adversarial imitation learning according to an embodiment of this application.

In an example of a round-robin role play game, the technical solution provided in this application may be used for training intelligent skill release of the game AI that serves as an NPC role. In the round-robin role play game, a game user and a game role of an NPC role in a game scenario often have multiple skills, and each round of skill release is related to a state of each game role in a current round. Therefore, complexity and difficulty of learning a game policy by the NPC role are relatively high, and costs for a network model to start learning directly from zero are extremely high. This embodiment of this application is based on the idea of imitation learning, that is, learning of a fight policy is performed by observing and imitating a skill release action of a real game user. In this embodiment of this application, the concept of generative adversarial learning is introduced based on imitation learning, so as to train game AI as an NPC role in a manner of generative adversarial imitation learning. FIG. 2 is a schematic diagram of a principle of generative adversarial imitation learning. As shown in FIG. 2, it is assumed that a user game data set $\{\tau_1, \tau_2, \ldots \tau_N\}$ of a real game user that is generated by running a game obeys a distribution, where user game data $\tau=\{\hat{s}_1, \hat{a}_1, \hat{s}_2, \hat{a}_2 \ldots \hat{s}_T, \hat{a}_T\}$, $\hat{s}$ indicates a user game state of a game action subject (for example, a game role controlled by the game user) corresponding to the real game user in a game scenario, and $\hat{a}$ indicates a user game action made by the real game user for a corresponding user game state. In this embodiment of this application, a model game data set $\{\tau_1,$ $\tau_2, \ldots \tau_N\}$ that imitates a game action of a real game user may be generated by continuously interacting with a game scenario by using an action model Actor, where $\tau=\{s_1, a_1, s_2, a_2 \ldots s_T, a_T\}$, s indicates a model game state of a game action subject (for example, an NPC role) corresponding to the action model in a game scenario, and a indicates a model game action made by the action model for a corresponding model game state. With the generative adversarial learning method, the model game data set may be gradually close to a probability distribution of the user game data set. By continuously learning the action model Actor, the probability distribution of the user game data may be finally learned. In this way, game actions such as skill release and kill target selection that are outputted by the action model are closer to the action of the real game user. The game AI has a higher personification effect and intelligence level, thereby improving human-computer interaction efficiency.

Figure 3:
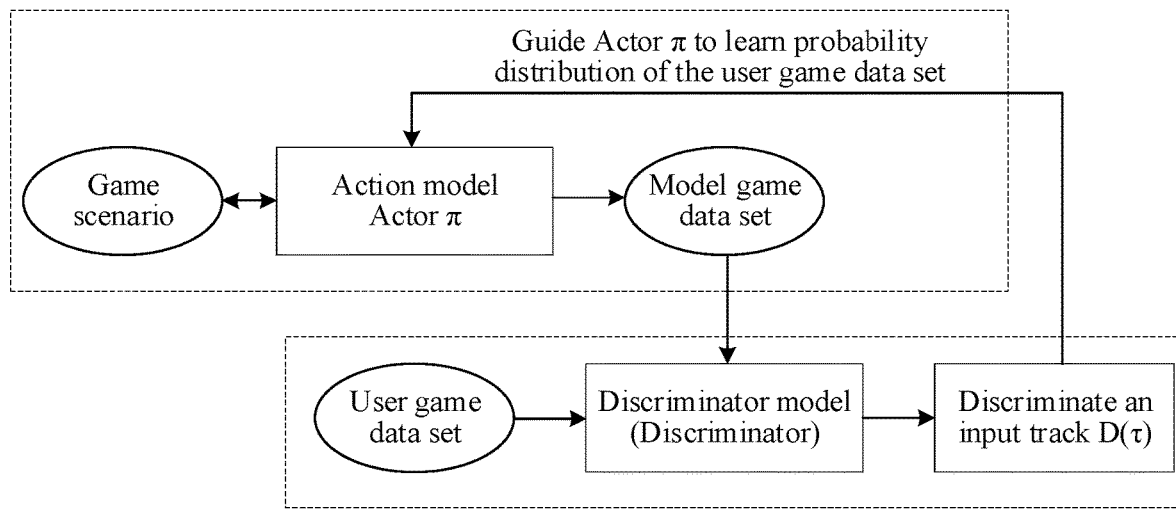
FIG. 3 is a schematic diagram of a model architecture of generative adversarial imitation learning according to an embodiment of this application.

FIG. 3 is a schematic diagram of a model architecture of generative adversarial imitation learning according to an embodiment of this application. As shown in FIG. 3, in a process of generative adversarial imitation learning, a learning objective of an action model Actor is to make, by continuously optimizing a policy $\pi$, a probability distribution of a model game data set $\{\tau_1, \tau_2, \ldots \tau_N\}$ generated by the action model Actor to be as close to a probability distribution of a user game data set $\{\hat{\tau}_1, \hat{\tau}_2, \ldots \hat{\tau}_N\}$ of a real game user as possible, so that a discriminator model Discriminator cannot distinguish whether data inputted into the model is user game data of the real game user or model game data generated by the action model Actor. A learning objective of the discriminator model Discriminator is to distinguish whether the data inputted into the model is user game data or model game data. In some embodiments, A learning algorithm of the action model Actor may be optimized by using a policy gradient algorithm in deep reinforcement learning, and a classification algorithm of supervised learning may be used for updating parameters of the discriminator model Discriminator.

The technical solution of this application is described in detail in the following. The following embodiments are mainly based on an example of a round-robin role play game. However, the embodiments of this application are not limited thereto.

Figure 4:
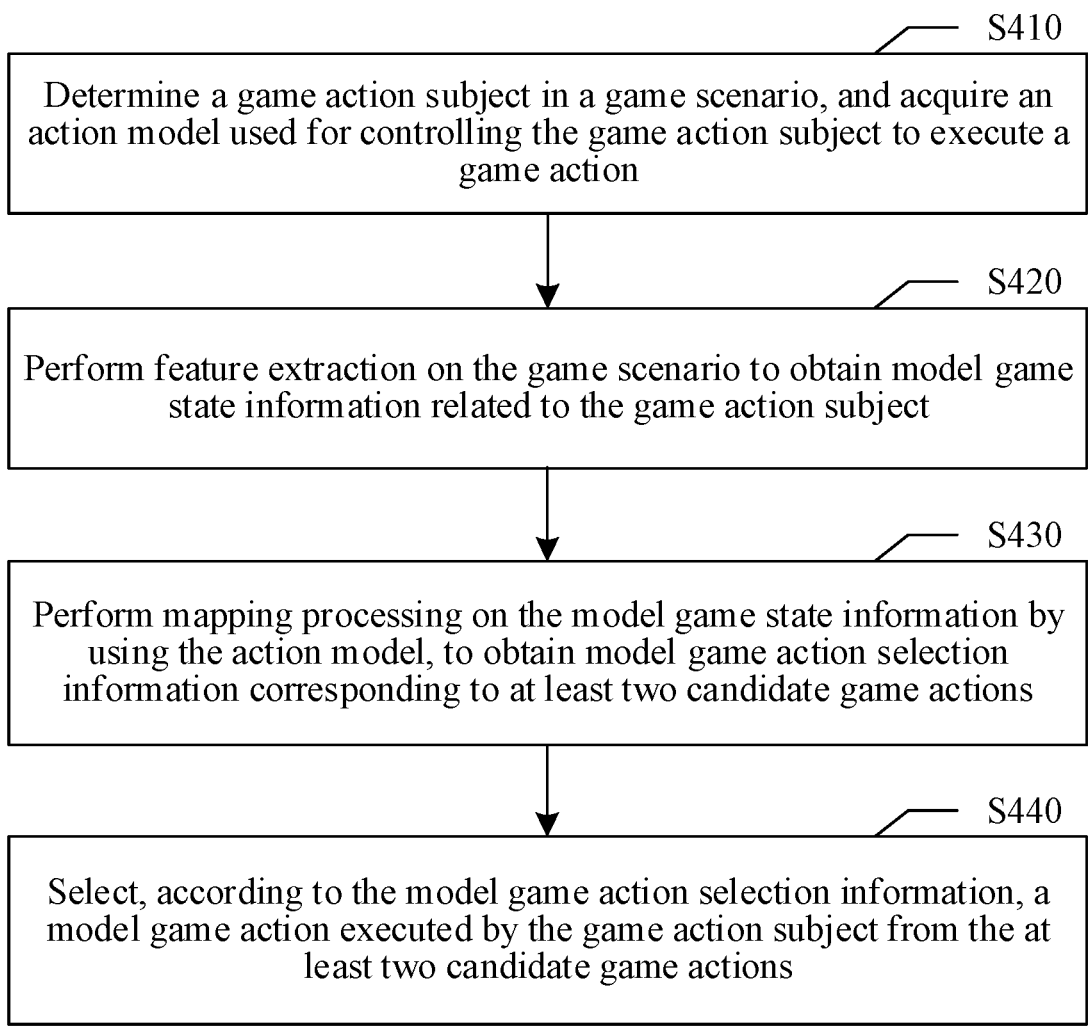
FIG. 4 is a schematic flowchart of an information processing method for making a game action decision according to an embodiment of this application.

FIG. 4 is a schematic flowchart of an information processing method for making a game action decision according to an embodiment of this application. In some embodiments, the method may be performed by an electronic device, and the electronic device may be a terminal or a server. As shown in FIG. 4, the method may mainly include the following steps:

Step S410. Determine a game action subject in a game scenario, and acquire an action model used for controlling the game action subject to execute a game action.

In the present disclosure, a game action subject may be referred as a subject. The game action subject is a subject object that executes a game action in the game scenario, for example, may be an NPC role in a game, and the NPC role may fight with a character role controlled by a game user. The action model is a pre-trained game AI model, and the action model may control, according to the game scenario, the game action subject to execute the game action. For example, one NPC role has eight different game skills, and release of the eight game skills belongs to eight different game actions. For another example, the NPC role may use multiple different types of game props, such as virtual weapons and virtual articles. Use of different types of game props may also be used as different types of game actions.

Step S420. Perform feature extraction on the game scenario to obtain model game state information related to the game action subject.

A game action implemented by the game action subject is related to a scenario feature of the game scenario. By performing feature extraction on multiple different types of scenario features, model game state information related to the game action subject may be obtained, where the scenario feature may include, for example, information such as a career, a hit point, and an available skill of a game role. The model game state information obtained by performing feature extraction may be a feature vector with a specified length, for example, may be a 38-dimensional vector. In some implementation, a feature vector with a specified length may refer to as a feature vector with a specified number of dimensions, for example, a feature vector with 38 dimensions, or with 80 dimensions.

For example, a method for extracting a feature of a scenario feature of a game scenario may include: first performing encoding processing on the scenario feature to obtain an encoding vector, and then multiplying the encoding vector by an embedded matrix to obtain a feature vector with a specified length.

Step S430. Perform mapping processing on the model game state information by using the action model, to obtain model game action selection information corresponding to at least two candidate game actions.

The action model may be a neural network model that includes multiple network layers, for example, may be a fully connected network model that includes multiple fully connected layers connected in sequence. Each network layer in the action model may be considered as a mapping function. Feature mapping processing is performed on the model game state information inputted into the action model layer by layer, so as to output the model game action selection information. The model game action selection information is action decision information corresponding to the at least two candidate game actions. For example, the model game action selection information may be a selection probability of each candidate game action obtained through action model analysis and decision-making. The candidate game actions may be, for example, different types of game skills that can be released by the game action subject in the game scenario.

Step S440. Select, according to the model game action selection information, a model game action executed by the game action subject from the at least two candidate game actions. In another implementation, the step S440 may include selecting, according to the model game action selection information, a model game action for the subject from the at least two candidate game actions.

The model game action selection information may be the selection probability of each candidate game action. In some implementations, in this step, a candidate game action with the highest selection probability may be used, by using a greedy algorithm, as the model game action executed by the game action subject. For one example, a first candidate game action may have a x % selection probability and x % is larger than any other candidate game action's selection probability. Based on the greedy algorithm according to its selection probability, only the first candidate game action may be selected because the first candidate game action's selection probability (x %) is the largest.

Alternatively in some other implementations, a model game action executed by the game action subject may be randomly selected, by using a random selection algorithm, from the at least two candidate game actions according to a selection probability. For one example, a first candidate game action may have a x % selection probability and a second candidate game action has a y % selection probability, and x>y. Based on random selection according to its selection probability, both the first candidate game action and the second candidate game action has a certain probability to be selected: the first candidate game action may have x % to be randomly selected, and the second candidate game action may have y % to be randomly selected.

According to the information processing method provided in this embodiment of this application, a scenario feature is obtained by performing feature extraction on a game scenario, an analysis decision is performed on the scenario feature by using a pre-trained action model, and a model game action executed by a game action subject may be selected from candidate game actions, so as to obtain a game action decision that meets a user expectation. When game AI is configured in a game, a model game action is selected based on a scenario feature of the game, so that the selected model game action is more adaptable to a game scenario, and corresponding model game actions are selected for different game scenarios, thereby enriching game actions implemented by the game AI, greatly improving a decision-making capability of the game AI, enabling the game AI to have a higher personification effect and intelligence level, and further improving human-computer interaction efficiency.

Figure 5:
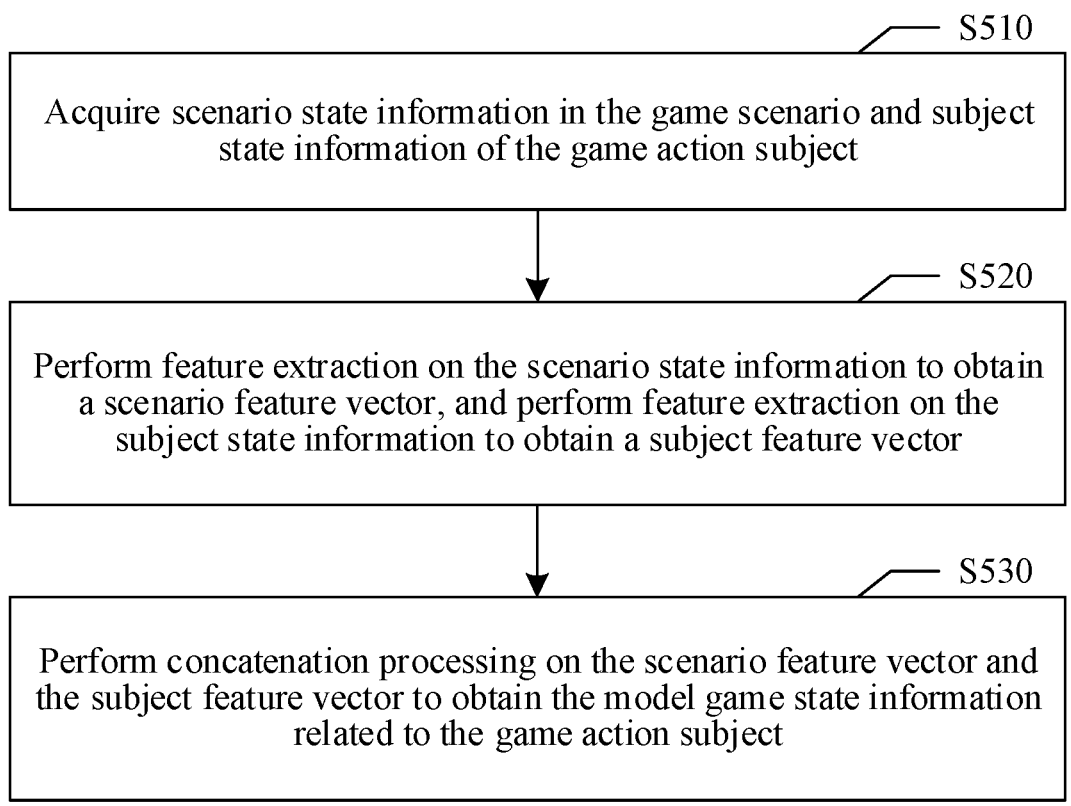
FIG. 5 is a schematic flowchart of feature extraction for a game scenario according to an embodiment of this application.

FIG. 5 is a schematic flowchart of feature extraction for a game scenario according to an embodiment of this application. As shown in FIG. 5, based on the foregoing embodiment, step S420 that perform feature extraction on the game scenario to obtain model game state information related to the game action subject may include the following steps:

Step S510. Acquire scenario state information in the game scenario and subject state information of the game action subject.

The scenario state information is information related to a scenario environment in the game scenario, and the subject state information is information related to a game attribute of the game action subject. For example, in a round-robin role play game, the scenario state information may include environment information such as a current round of fight and a distribution location of a fight object, and the subject state information may include attribute information such as a career, a hit point, and a magic volume of the game action subject.

Step S520. Perform feature extraction on the scenario state information to obtain a scenario feature vector, and perform feature extraction on the subject state information to obtain a subject feature vector.

The scenario state information may include multiple different types of environment information, and feature extraction may be separately performed on each type of environment information to obtain multiple scenario feature vectors. The subject state information may also include multiple different types of attribute information, and feature extraction may be separately performed on each type of attribute information to obtain multiple subject feature vectors.

Step S530. Perform concatenation processing on the scenario feature vector and the subject feature vector to obtain the model game state information related to the game action subject.

After concatenation processing is performed on the scenario feature vector and the subject feature vector according to a specified concatenation sequence, a concatenation vector with a specified length may be formed, and the concatenation vector is used as the model game state information related to the game action subject.

By separately performing feature extraction on the scenario state information and the subject state information, the model game state information that covers multiple types of environment information and attribute information may be obtained, and the information has multiple feature dimensions. Action decision-making based on multiple feature dimensions can improve an analysis and decision-making capability of the action model, and improve an intelligence level of the action model.

Figure 6:
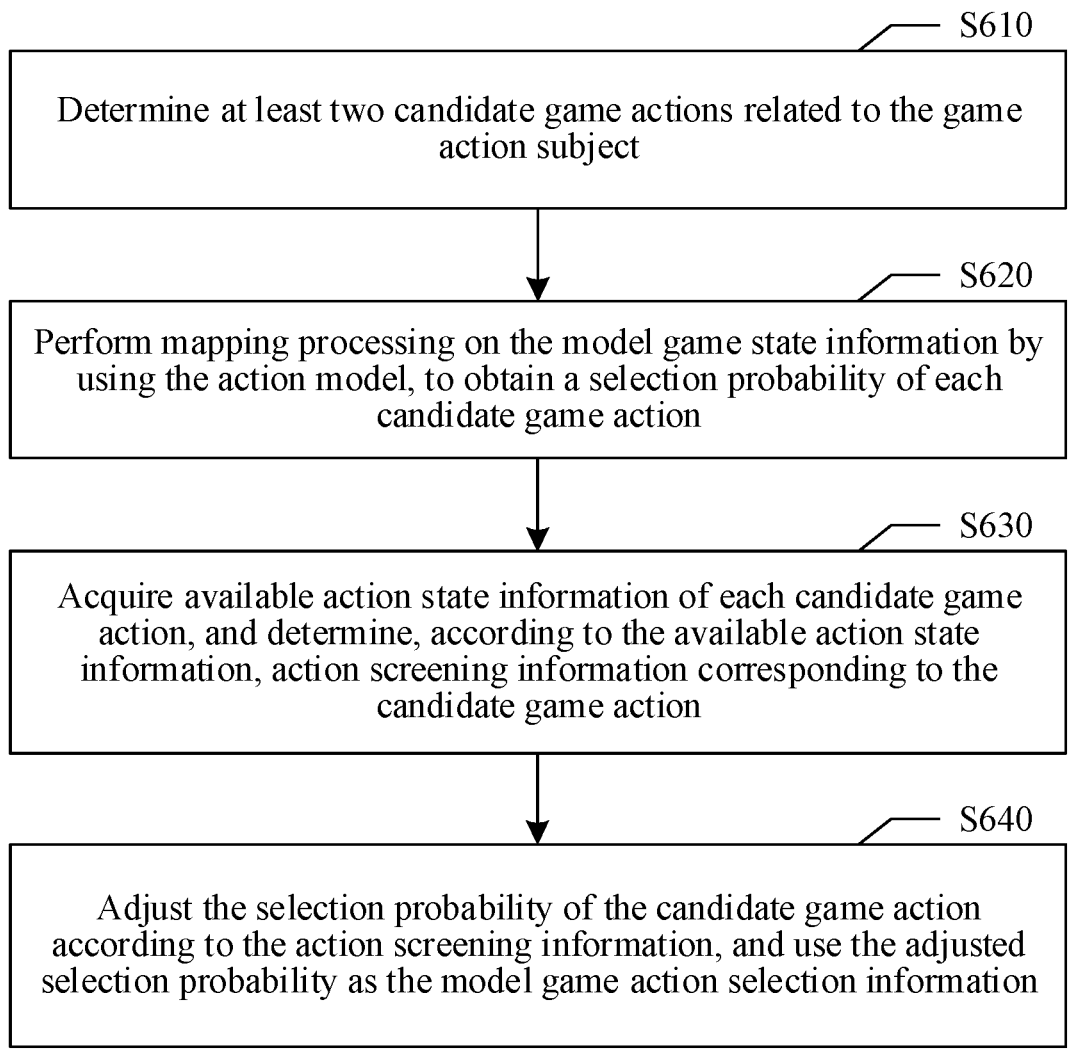
FIG. 6 is a schematic flowchart of feature mapping by using an action model according to an embodiment of this application.

FIG. 6 is a schematic flowchart of feature mapping by using an action model according to an embodiment of this application. As shown in FIG. 6, based on the foregoing embodiment, step S430 that perform mapping processing on the model game state information by using the action model, to obtain model game action selection information corresponding to at least two candidate game actions may include the following steps:

Step S610. Determine at least two candidate game actions related to the game action subject.

The candidate game action is a game action that can be selected and executed by the game action subject. For example, when the game action subject is a game role, the candidate game action may be that the game role releases a game skill or uses a game prop.

Step S620. Perform mapping processing on the model game state information by using the action model, to obtain a selection probability of each candidate game action.

The selection probability determines a probability that each candidate game action is selected as a model game action. A higher selection probability of a candidate game action indicates that the action model predicts a better game gain effect of executing the candidate game action.

Step S630. Acquire available action state information of each candidate game action, and determine, according to the available action state information, action screening information corresponding to the candidate game action.

The action available state information indicates whether each candidate game action is available in a current game scenario, and corresponding action screening information may be determined based on the action available state information of each candidate game action. The action screening information may be a screening vector with a specified length, and the length of the screening vector is a quantity of candidate game actions. For example, eight candidate game actions may correspond to an 8-dimensional screening vector. Each element in the screening vector may have a value of 0 or 1, and a value of 0 indicates that a corresponding candidate game action cannot be selected and executed, and a value of 1 indicates that a corresponding candidate game action can be selected and executed.

Step S640. Adjust the selection probability of the candidate game action according to the action screening information, and use the adjusted selection probability as the model game action selection information.

According to the action screening information, it may be determined that the candidate game action is an available action or an unavailable action. The available action is a game action that can be selected and executed, and the unavailable action is a game action that cannot be selected and executed. In a case that the candidate game action is an available action, a selection probability of the candidate game action remains unchanged. In a case that the candidate game action is an unavailable action, a selection probability of the candidate game action is adjusted to a preset probability. For example, the selection probability of the candidate game action may be adjusted to 0, or may be adjusted to the minimum value close to 0.

The action screening information is acquired, and the candidate game action is filtered based on the action screening information in a manner of adjusting the selection probability, thereby improving decision precision of the action model and avoiding a problem of invalid action decision.

Figure 7:
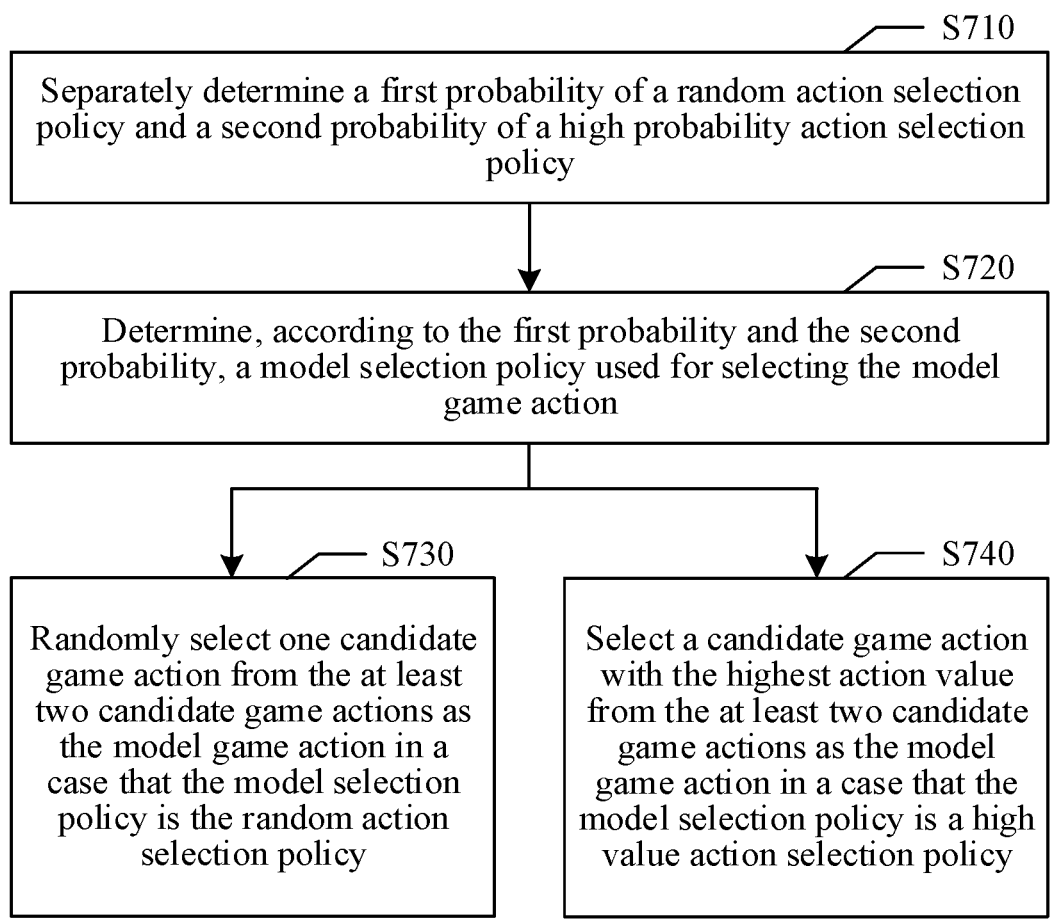
FIG. 7 is a schematic flowchart of selecting a model game action based on a c-greedy policy according to an embodiment of this application.

The model game action may be selected according to the acquired game action selection information by using different action selection policies. FIG. 7 is a schematic flowchart of selecting a model game action based on a ε-greedy policy according to an embodiment of this application.

As shown in FIG. 7, based on the foregoing embodiments, step S440 that select, according to the model game action selection information, a model game action executed by the game action subject from the at least two candidate game actions may include the following steps:

Step S710. Separately determine a first probability of a random action selection policy and a second probability of a high probability action selection policy.

The random action selection policy and the high probability action selection policy are two different game action selection policies. The high probability action selection policy refers to using a candidate game action with the highest selection probability from multiple candidate game actions as the model game action. In some implementations, the random action selection policy refers to selecting one of multiple candidate game actions as the model game action in an equal probability random selection manner. Alternatively, in some other implementations, the random action selection policy refers to selecting one of multiple candidate game actions as the model game action with a random selection probability according to its selection probability, respectively.

For example, in a case that the first probability of the random action selection policy is ε, the second probability of the high probability action selection policy may be correspondingly determined as 1−ε.

Step S720. Determine, according to the first probability and the second probability, a model selection policy used for selecting the model game action.

Each time before the model game action is selected, a model selection policy may be first determined according to the first probability and the second probability. For example, when a value of ε is 0.1, there is a 10% probability of using the random action selection policy as the model selection policy, and a 90% probability of using the high probability action selection policy as the model selection policy. For another example, when a value of ε is 0.01, there is a 1% probability of using the random action selection policy as the model selection policy, and a 99% probability of using the high probability action selection policy as the model selection policy.

Step S730. Randomly select one candidate game action from the at least two candidate game actions as the model game action in a case that the model selection policy is the random action selection policy.

In a case that the model selection policy is the random action selection policy, in this step, one candidate game action may be randomly selected from multiple candidate game actions in an equal probability random selection manner as the model game action. Alternatively, in a case that the model selection policy is the random action selection policy, in this step, one candidate game action may be randomly selected from multiple candidate game actions with a random selection probability according to its selection probability, respectively.

Step S740. Select a candidate game action with the highest action value from the at least two candidate game actions as the model game action in a case that the model selection policy is a high value action selection policy.

The high value action selection policy is described herein. In this embodiment of this application, the high value action selection policy is a policy used for determining a model game action. By acquiring an action value of each candidate game action, a candidate game action with the highest action value is selected from the at least two candidate game actions according to the action values as the model game action.

In actual implementation, the action value corresponding to the candidate game action may be evaluated to evaluate the action value corresponding to the candidate game action. In some embodiments, an action value corresponding to the candidate game action may be determined according to performance obtained after the candidate game action is implemented, and the performance may be represented by using a kill power index or an obtained reward. For example, in a case that a kill power index that exists in a candidate game action A is 95, a kill power index that exists in a candidate game action B is 80, and a kill power index that exists in a candidate game action C is 65, the candidate game action A whose action value is the highest (the kill power index is the highest) is selected as the model game action according to the high value action selection policy. For another example, in a case that a reward obtained after a candidate game action D is implemented is 100 virtual coins, a reward obtained after a candidate game action E is implemented is 200 virtual coins, and a reward obtained after a candidate game action F is implemented is 150 virtual coins, the candidate game action E with the highest value (the reward is the highest) is selected as the model game action according to the high value action selection policy.

In a case that the current selection policy is the high probability action selection policy, in this step, the candidate game action with the highest selection probability may be used as the model game action. For example, a game skill A, a game skill B, and a game skill C are released as three candidate game actions, and selection probabilities of the game skills are successively 70%, 20%, and 10%. In this step, the game skill A with the highest selection probability may be used as the model game action.

In this embodiment of this application, the model game action is selected by using the ε-greedy policy, and corresponding model game action selection is performed for different action selection policies, which can improve a continuous optimization capability of the action model, and further improve accuracy of the action model for model game action selection.

Figure 8:
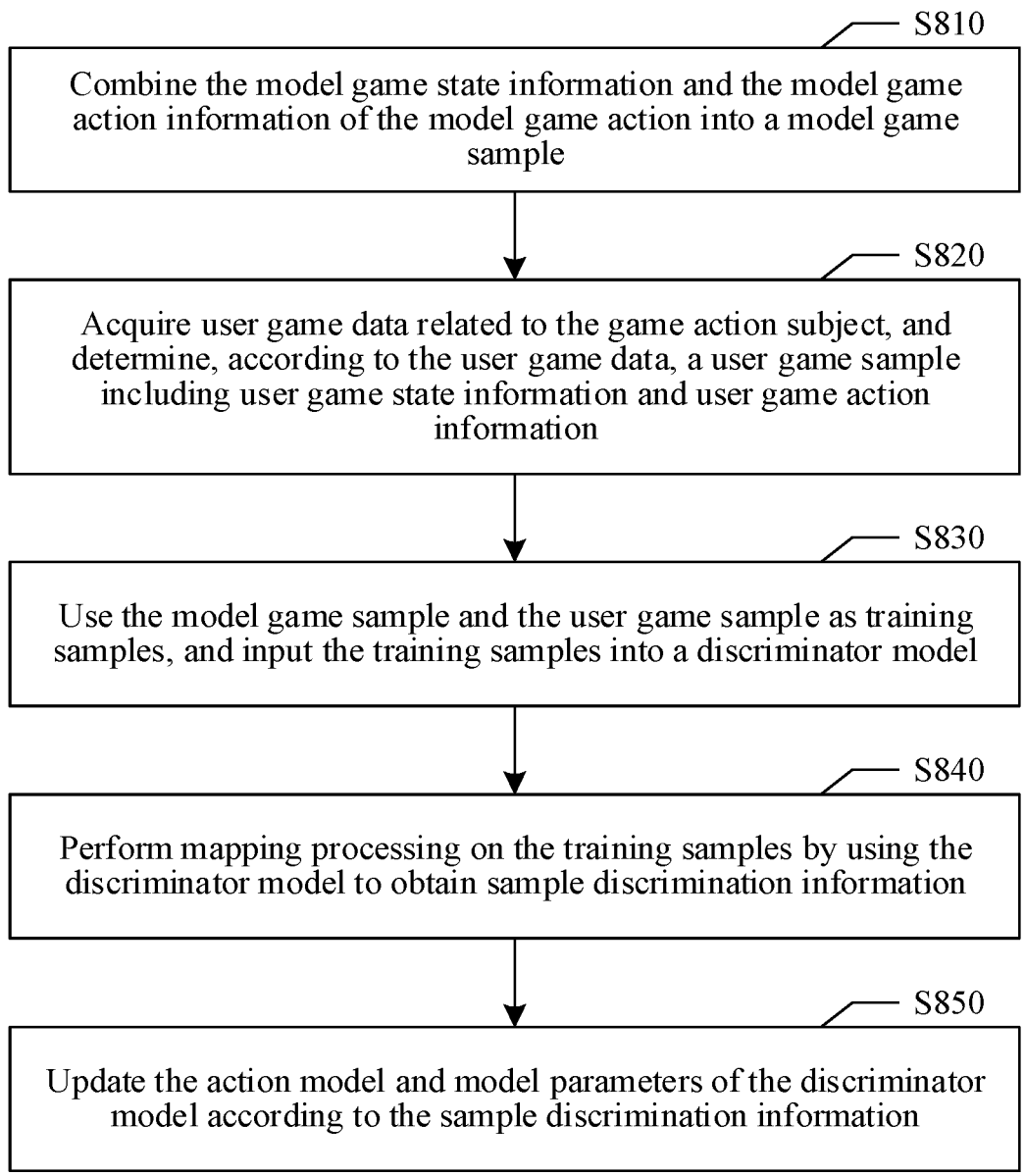
FIG. 8 is a schematic flowchart of model optimization for an action model according to an embodiment of this application.

In actual application, by continuously collecting user game data of a real game user and acquiring model game data of the action model, parameter update and optimization can be continuously performed on the action model. FIG. 8 is a schematic flowchart of model optimization for an action model according to an embodiment of this application. As shown in FIG. 8, based on the foregoing embodiments, a method for performing model optimization on an action model may include the following steps:

Step S810. Combine the model game state information and the model game action information of the model game action into a model game sample.

In this step, at least one game round (for example, one game round in a round-robin game) in a game scenario may be first determined, and game sequence information of each game round is acquired.

Then, model game state information corresponding to a game round and the model game action information of the model game action are combined into a model decision information pair.

Finally, a model decision information pair of each game round is combined into a model decision information pair sequence according to the game sequence information, and the model decision information pair sequence is used as the model game sample corresponding to the game scenario.

Using the model decision information pair sequence as a model game sample may improve a representation capability of the sample, and in a training process, an intrinsic association feature between multiple consecutive actions may be better learned, so as to obtain a better model training effect.

For example, in a case that three game rounds are included in a game scenario, model decision information pairs (s1, a1), (s2, a2), and (s3, a3) may be correspondingly determined for the game rounds. s represents model game state information, and a represents model game action information. The three model decision information pairs are arranged according to a game round sequence, and may form a model decision information pair sequence {s1, a1, s2, a2, s3, a3}. The model decision information pair sequence is used as a model game sample corresponding to the game scenario.

Step S820. Acquire user game data related to the game action subject, and determine, according to the user game data, a user game sample including user game state information and user game action information.

As an imitation learning object of the action model, in this step, the user game data related to the game action subject may be acquired, and the user game sample is obtained based on the user game data.

Similar to a manner of acquiring the model game sample, in this step, at least one game round in the game scenario may be first determined according to the user game data, and game sequence information of each game round is acquired.

Then, user game state information corresponding to a game round and the user game action information are combined into a user decision information pair.

Finally, a user decision information pair of each game round is combined into a user decision information pair sequence according to the game sequence information, and the user decision information pair sequence is used as the user game sample corresponding to the game scenario.

Step S830. Use the model game sample and the user game sample as training samples, and input the training samples into a discriminator model.

In some embodiments, A method for performing vectorization processing on a training sample to input to a discriminator model in this step may include the following steps:

acquiring a first feature vector corresponding to the game state information (which may be model game state information or user game state information) and a second feature vector corresponding to the game action information (which may be model game action information or user game action information). For example, the first feature vector is a 38-dimensional vector, and the second feature vector is an 8-dimensional vector.

Concatenation processing is performed on the first feature vector and the second feature vector to obtain a sample feature vector of a decision information pair (which may be a model decision information pair or a user decision information pair). The sample feature vector may be, for example, a 46-dimensional vector formed by concatenating the first feature vector and the second feature vector successively.

Sample feature vectors of the decision information pairs in the training samples are sequentially inputted into the discriminator model according to the game sequence.

By performing vectorization processing on the decision information in the training sample, uniform sample feature vectors may be obtained and then successively inputted into the discriminator model, thereby improving discrimination efficiency of the discriminator model, improving model training efficiency, and reducing computing resource consumption.

Step S840. Perform mapping processing on the training samples by using the discriminator model to obtain sample discrimination information.

The sample discrimination information is used for discriminating that the training samples are model game samples or user game samples. In some implementations, the sample discrimination information may be used for discriminating the training samples being model game samples from being user game samples. In some other implementations, the sample discrimination information may be used for determine whether the training samples are model game samples or user game samples.

In some embodiments, A method for obtaining sample discrimination information in this step may include the following steps:

acquiring an information pair quantity of decision information pairs in the training samples; where for example, the information pair quantity is T;

performing mapping processing on the sample feature vector of each decision information pair by using the discriminator model, to obtain an information pair classification probability of each decision information pair; where for example, the information pair classification probability of each decision information pair is $d_t$, and a value of $d_t$ is 1–T; and determining a sample classification probability of the training samples according to the information pair quantity and the information pair classification probability, and using the sample classification probability as the sample discrimination information. For example, an average value $$\frac{1}{T}\sum_{t=1}^{T} d_t$$

of the information pair classification probabilities may be directly used as the sample classification probability. In a case that the sample classification probability is greater than 0.5, the training sample may be discriminated as a user game sample. In a case that the sample classification probability is less than or equal to 0.5, the training sample may be discriminated as a model game sample.

A sample classification probability is calculated according to information pair classification probabilities of several decision information pairs, which can improve discrimination accuracy of the discriminator model and avoid a problem of abnormal discrimination result.

Step S850. Update the action model and model parameters of the discriminator model according to the sample discrimination information.

The action model and the discriminator model can form a generative adversarial network (GAN) to continuously update the model parameters of the two during an adversarial process. The discriminator model needs to improve its own discrimination capability as much as possible, so as to improve accuracy of the sample discrimination information by updating and optimizing the model parameters. In addition, the action model needs to improve its own imitation capability as much as possible, and update and optimize the model parameters to output a model game sample whose probability distribution is close to that of a user game sample; therefore, it is difficult for the discriminator model to accurately distinguish a sample type of the training sample. An action model that is close to a decision action feature of a real game user may be obtained by iteratively updating the model parameters through adversarial learning.

In some embodiments, in this step, an objective function may be first determined, the objective function including a user sample expectation corresponding to the user game sample and a model sample expectation corresponding to the model game sample; and model parameters of the action model and the discriminator model are alternately updated according to the sample discrimination information and the objective function.

In actual implementation, the parameters of the action model and the discriminator model are updated in an adversarial game manner, and a common objective function of the two includes a user sample expectation corresponding to the user game sample and a model sample expectation corresponding to the model game sample. For example, the user sample expectation may be represented as $E_{\hat{\tau} \sim p_{data}(\tau)}[\log D(\hat{\tau})]$ and the model sample expectation may be represented as $E_{\tau \sim p_{actor}(\tau)}[\log(1-D(\tau))]$. $p_{data}(\hat{\tau})$ represents the probability distribution of the user game sample, and $D(\hat{\tau})$ represents the sample classification probability of the user game sample in the discriminator model. $p_{actor}(\tau)$ represents the probability distribution of the model game sample, and $D(\tau)$ represents the sample classification probability of the model game sample in the discriminator model.

Parameter update processes of the action model and the discriminator model may be performed alternately. For example, after the model parameters of the action model are updated once, the model parameters of the discriminator model may be updated once immediately, so that iterative updating of the model parameters is repeatedly performed alternately. For another example, to improve model training efficiency, the action model may be continuously iteratively updated for multiple times, and then the discriminator model is updated once.

A training objective of the discriminator model is to discriminate the user game sample and the model game sample in the training samples as accurately as possible. Therefore, in a training round of the discriminator model, the model parameters of the action model may be fixed, and the model parameters of the discriminator model are updated according to the sample discrimination information and the objective function, to increase a sample classification probability of the user game sample and reduce a sample classification probability of the model game sample.

A training objective of the action model is to deceive the discriminator model as much as possible, so that it is difficult for the discriminator model to correctly discriminate the user game sample and the model game sample in the training samples. Therefore, in a training round of the action model, the model parameters of the discriminator model may be fixed, and the model parameters of the action model are updated according to the sample discrimination information and the objective function, to increase the sample classification probability of the model game sample.

In the model optimization method for the action model provided in this embodiment of this application, the probability distribution of the user game sample is learned from the game data of the real game user through generative adversarial imitation learning, and the action model may be guided to make a game action policy that is close to the action feature of the real game user or that meets the action expectation of the real game user. The training method based on generative adversarial imitation learning can not only reduce computing resource consumption in the model training process, but also improve model training efficiency, thereby obtaining a better training effect.

With reference to an application scenario in a one-round game, the following describes the training method for the action model involved in the foregoing embodiments.

Figure 9:
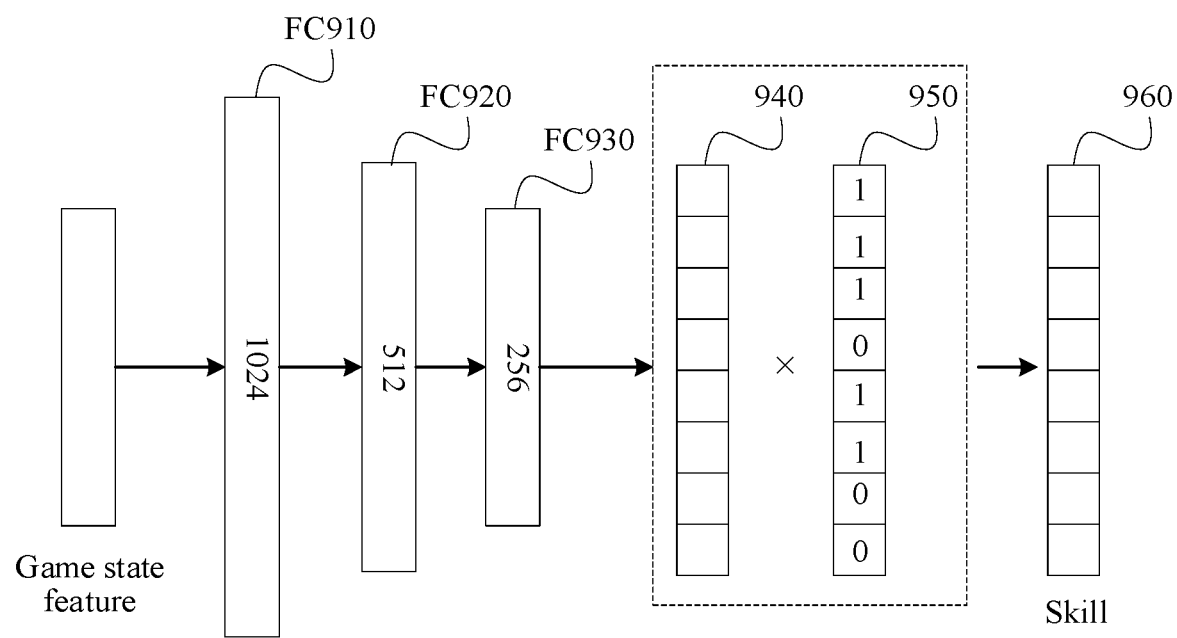
FIG. 9 is a schematic diagram of a network architecture of an action model according to an embodiment of this application.

FIG. 9 is a schematic diagram of a network architecture of an action model according to an embodiment of this application. As shown in FIG. 9, the action model is mainly a multilayer perception network structure, and an input to the model is a game state feature State in a current game round. For example, the game state feature State may be represented as a 38-dimensional feature vector, and information involved may include, for example:

a) basic attributes of a role, such as a hit point, physical attack, magic, treatment, physical defense, magic defense, speed, command, and resist;
b) career of the role;
c) tactical features of the fight;
d) round quantity of the current fight; and
e) currently available skills.

An overall structure of the action model mainly includes: three fully connected layers FC910, FC920, and FC930 whose dimensions are 1024, 512, and 256 respectively; and further includes one fully connected output layer 940 whose output vector dimension is 8; and the fully connected output layer 940 may output selection probabilities of eight game skills skill_1, skill_2, . . . , and skill_8 in total. The 8-dimensional vector outputted by the fully connected output layer 940 is multiplied by a skill screening vector 950 whose dimension is 8, to finally obtain a skill output layer 960 whose output vector dimension is 8, and a result outputted by the skill output layer 960 is probability distribution that each skill of a game role in a game is released in this round.

The output vector dimension of the fully connected output layer 940 is 8, representing that a game role has eight skills at most. In a round-robin game, some skills of a game role may have an additional effect after being released in a certain round, for example, when a player enters a rest state and cannot release a skill in a next round, or when a hit point of a game role is lower than a certain state, some specific skills cannot be used. Therefore, a prediction probability of each skill that is predicted and outputted by the action model needs to be multiplied by a skill screening vector, so as to obtain an actually available skill of the game role in each round. The skill screening vector with a dimension 8 includes eight elements with a value of 0 or 1, and the value of 0 or 1 is determined by a skill available list sent by a game client in each round. Taking a role play round-robin game as an example, a role with a male gender and a career as force is used. A skill list of the game role is ["Blazing sun shock", "Triple powerful slashes", "Life perception", "Blood plundering", "Shadow delver", "Aoyi•Earth crack star"], which includes six active skills in total. In a case that a skill screening vector of the game role in a game round is [1, 1, 1, 0, 1, 1, 0, 0], a value of the fourth position of the game screening vector is 0, which indicates that the fourth skill "Blood plundering" of the role in this round is unavailable, the value of the seventh position and the value of the eighth position are filled with 0 because the role has only six active skills that can be released, and the values of the remaining elements are 1, which indicates that the remaining skills of the role in this round are available. In this manner, the skill screening vector is introduced to the action model to select game skills that can be selected for different game roles in different fight rounds. In this way, not only precision of action model prediction can be improved, but also invalid skill selection is avoided.

Figure 10:
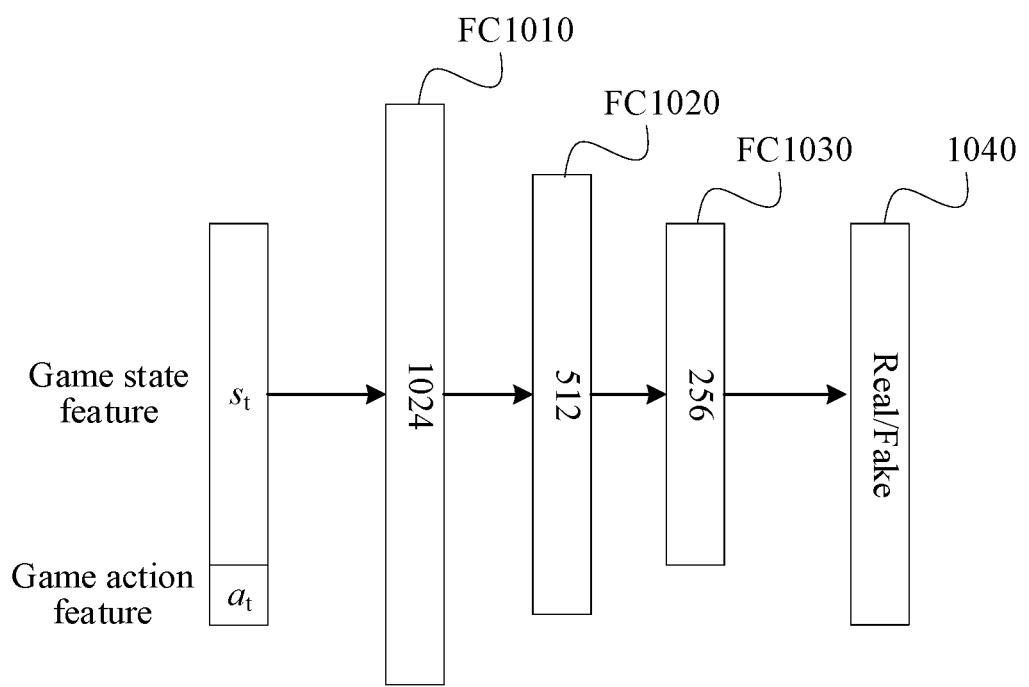
FIG. 10 is a schematic diagram of a network architecture of a discriminator model according to an embodiment of this application.

FIG. 10 is a schematic diagram of a network architecture of a discriminator model according to an embodiment of this application. As shown in FIG. 10, an input to the discriminator model is game track data of a game role, for example, may be a feature vector formed by concatenating a 38-dimensional game state feature $s_t$ and an 8-dimensional game action feature at. The input to the discriminator model may be state-action track data of a real game user, or may be state-action track data generated by an action model. An overall structure of the discriminator model mainly includes three fully connected layers FC1010, FC1020, and FC1030 whose dimensions are 1024, 512, and 256, respectively. An output layer of the discriminator model is a two-dimensional classifier 1040. When a classification probability predicted by the model is greater than 0.5, the discriminator model discriminates that track data inputted into the model is state-action track data Real of a real player. When the classification probability is less than 0.5, the discriminator model discriminates that the inputted track data is state-action track data Fake generated by the action model.

In a model training process, a training objective of the discriminator model is to distinguish track data $\{s_1, a_1, s_2, a_2 \ldots s_T, a_T\}$ generated by the action model from track data $\{\hat{s}_1, \hat{a}_1, \hat{s}_2, \hat{a}_2 \ldots \hat{s}_T, \hat{a}_T\}$ of a real game user as far as possible, that is, to maximize $D(\tau)$ so that a probability that a training sample is allocated to a correct label is the maximum, where $$D(\hat{\tau}) = \frac{1}{T}\sum_{t=1}^{T} d(s_t, a_t),$$

and $d(s_t, a_t)$ is an output probability of the action model for an inputted decision information pair $(s_t, a_t)$. A training objective of the action model is to generate, as far as possible, samples whose distribution is close to that of real game track data of a real game user to deceive the discriminator model, that is, to minimize $\log(1-D(\tau))$. The essence of generative adversarial imitation learning is to continuously perform a minmax adversarial game. The objective function formula is as follows:

$$\min_A \max_D V(D, A) = E_{\hat{\tau} \sim p_{data}(\hat{\tau})}[\log D(\hat{\tau})] + E_{\tau \sim p_{actor}(\tau)}[\log(1 - D(\tau))]$$

In an early stage of model training, because an imitation capability of the action model at the beginning of training is poor, a result outputted by the model is obviously different from game data of a real game user. Therefore, the discriminator model can discriminate authenticity with a very high confidence level, and an outputted probability value is close to 1 or 0. In this way, a gradient of a generative network disappears easily. In this case, in the objective function, minimization of $\log(1-D(\tau))$ may be replaced with maximization of $\log D(\tau)$ in the training round of the action model, which provides a relatively large gradient in the early stage of training.

After a generative adversarial network formed by the action model and the discriminator model is established, model training may be started.

First, weight parameters of the action model and the discriminator model are randomly initialized, and by randomly initializing a weight of a neural network model, convergence speeds and performance of the models can be improved.

Then, a game state feature state in a current game round of a game is used as an input to an action model whose weight parameter is $\theta^\pi$, a game action feature action outputted from the action model is used as a release skill of a game role in the game round, and a state action sequence $\tau = \{s_1, a_1, s_2, a_2 \ldots s_T, a_T\}$ may be generated by continuously interacting with the action model by using a game environment. In this manner, a track data set $\{\tau_1, \tau_2, \ldots \tau_N\}$ generated by the action model may be obtained after N rounds of game.

A model parameter of the discriminator model is updated by using a cross-entropy loss function, an output probability of $D(\hat{\tau}_i)$ corresponding to a real game track of a real game user is increased, and an output probability of $D(\tau_i)$ corresponding to a generative game track generated by the action model is reduced.

A policy gradient algorithm in deep reinforcement learning is used for updating the model parameter of the action model, thereby increasing the output probability of $D(\tau_i)$.

An objective function of reinforcement learning is:

$$A(\theta) = E\left(\sum_{t=1}^{T} R(s_t, a_t); \pi_\theta\right) = \sum_\tau P(\tau; \theta) R(\tau)$$

where
$\tau = \{s_1, a_1, s_2, a_2 \ldots s_T, a_T\}$ represents a group of states and action sequences.

$$R(\tau) = \sum_{t=1}^{T} R(s_t, a_t)$$

represents the sum of a cumulative reward of sequence $\tau$.

$P(\tau; \theta)$ represents an occurrence probability of sequence $\tau$.

The objective of the policy gradient method is to find a set of best parameters $\theta^*$ to represent a policy function, so that an expectation of the cumulative reward is the maximum, that is:

$$\max A(\theta) = \max \sum_\tau P(\tau; \theta) R(\tau)$$

A process of searching for the optimal parameter $\theta^*$ is searching for an optimal policy or an optimal path. This is implemented by performing parameter optimization and updating by using a gradient descent algorithm in the policy gradient algorithm, that is, $$\theta^\pi \leftarrow \theta^\pi + \eta \nabla_\theta A(\theta)$$

where $\eta$ is a learning rate.

The gradient of the objective function is calculated as follows:

$$\nabla_\theta A(\theta) = \nabla_\theta \sum_\tau P(\tau; \theta) R(\tau)$$
$$= \sum_\tau P(\tau; \theta) R(\tau) \nabla_\theta \log P(\tau; \theta)$$

Calculation of the gradient is converted into solving of an expectation of $R(\tau)\nabla_\theta \log P(\tau; \theta)$, and the gradient may be approximated by using the Monte Carlo method, that is, N tracks are sampled according to a current policy to approximate the gradient of the objective function.

$$\nabla_\theta A(\theta) \approx \sum_{i=1}^{N} R(\tau) \nabla_\theta \log P(\tau; \theta)$$

During generative adversarial imitation learning, when the action model updates the parameter by using the policy gradient algorithm, $R(\tau)$ is not directly given by the system. Instead, an output $D(\tau)$ of the discriminator model is used as $R(\tau)$ to represent the sum of the rewards of sequence $\tau$. Therefore, the parameter of the action model is updated as follows:

$$\theta^\pi \leftarrow \theta^\pi + \eta \sum_{i=1}^{N} D(\tau_i) \nabla_{\theta^\pi} \log P(\tau_i \mid \pi)$$

Based on the technical solution for training the action model provided in this embodiment of this application, game AI that is close to an action decision habit of a real game user or meets an action decision expectation of a real game user may be configured in a video game. The game AI may be used as an NPC role to participate in a game running process, or may be used as a test role to perform an automated test in a game development process.

Although the steps of the embodiments of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step for execution, and/or one step may be decomposed into a plurality of steps for execution, and the like.

The following describes apparatus embodiments of the embodiments of this application, and the apparatus embodiments may be used for performing the training method for the action model involved in the foregoing embodiments or the determining method for a game behavior based on AI. For details not disclosed in the apparatus embodiments of this application, reference may be made to the foregoing method embodiments of this application.

Figure 11:
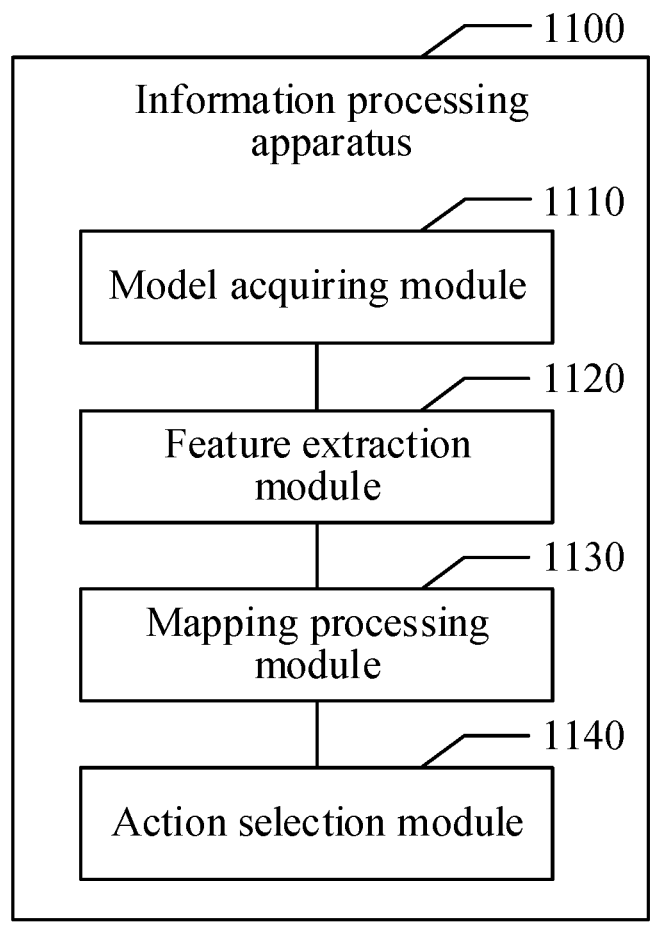
FIG. 11 is a structural block diagram of an information processing apparatus according to an embodiment of this application.

FIG. 11 is a schematic structural block diagram of an information processing apparatus according to an embodiment of this application. As shown in FIG. 11, the information processing apparatus 1100 may mainly include:

a model acquiring module 1110, configured to: determine a game action subject in a game scenario, and acquire an action model used for controlling the game action subject to execute a game action;

a feature extraction module 1120, configured to perform feature extraction on the game scenario to obtain model game state information related to the game action subject;

a mapping processing module 1130, configured to perform mapping processing on the model game state information by using the action model, to obtain model game action selection information corresponding to at least two candidate game actions; and an action selection module 1140, configured to select, according to the model game action selection information, a model game action executed by the game action subject from the at least two candidate game actions.

In this embodiment of this application, the feature extraction module 1120 may include:

an information acquiring unit, configured to acquire scenario state information in the game scenario and subject state information of the game action subject;

a feature extraction unit, configured to: perform feature extraction on the scenario state information to obtain a scenario feature vector, and perform feature extraction on the subject state information to obtain a subject feature vector; and a vector concatenation unit, configured to perform concatenation processing on the scenario feature vector and the subject feature vector to obtain the model game state information related to the game action subject.

In some embodiments, The mapping processing module 1130 may include:

an action determining unit, configured to determine at least two candidate game actions related to the game action subject;

a mapping processing unit, configured to perform mapping processing on the model game state information by using the action model, to obtain a selection probability of each candidate game action;

an action screening unit, configured to: acquire available action state information of each candidate game action, and determine, according to the available action state information, action screening information corresponding to the candidate game action; and a probability adjustment unit, configured to adjust the selection probability of the candidate game action according to the action screening information, and use the adjusted selection probability as the model game action selection information.

In some embodiments, the probability adjustment unit may include:

an action determining subunit, configured to determine an action type of the candidate game action according to the action screening information, the action type including an available action and an unavailable action; and a probability adjustment subunit, configured to: adjust the selection probability of the candidate game action to a preset probability in a case that the action type of the candidate game action is an unavailable action.

In some embodiments, the action selection module 1140 may include:

a probability determining unit, configured to separately determine a first probability of a random action selection policy and a second probability of a high probability action selection policy;

a policy determining unit, configured to determine, according to the first probability and the second probability, a model selection policy used for selecting the model game action;

a first selection unit, configured to: randomly select one candidate game action from the at least two candidate game actions as the model game action in a case that the model selection policy is the random action selection policy; and a second selection unit, configured to: select a candidate game action with the highest action value from the at least two candidate game actions as the model game action in a case that the model selection policy is a high value action selection policy.

In some embodiments, the information processing apparatus may further include:

a model sample acquiring module, configured to combine the model game state information and the model game action information of the model game action into a model game sample;

a user sample acquiring module, configured to acquire user game data related to the game action subject, and determine, according to the user game data, a user game sample including user game state information and user game action information;

a sample input module, configured to: use the model game sample and the user game sample as training samples, and input the training samples into a discriminator model;

a sample discrimination module, configured to perform mapping processing on the training samples by using the discriminator model to obtain sample discrimination information, the sample discrimination information being used for discriminating that the training samples are model game samples or user game samples; and a parameter updating module, configured to update the action model and model parameters of the discriminator model according to the sample discrimination information.

In some embodiments, the model sample acquiring module may include:

a model round determining unit, configured to: determine at least one game round in a game scenario, and acquire game sequence information of each game round;

a model information acquiring unit, configured to combine model game state information corresponding to a game round and the model game action information of the model game action into a model decision information pair; and a model sample acquiring unit, configured to: combine a model decision information pair of each game round into a model decision information pair sequence according to the game sequence information, and use the model decision information pair sequence as the model game sample corresponding to the game scenario.

In some embodiments, the user sample acquiring module may include:

a user round determining unit, configured to: determine at least one game round in a game scenario according to the user game data, and acquire game sequence information of each game round;

a user information acquiring unit, configured to combine user game state information corresponding to a game round and the user game action information into a user decision information pair; and a user sample acquiring unit, configured to: combine a user decision information pair of each game round into a user decision information pair sequence according to the game sequence information, and use the user decision information pair sequence as the user game sample corresponding to the game scenario.

In some embodiments, the sample input module may include:

a sample information acquiring unit, configured to: acquire, from the training samples, decision information pairs arranged in a game sequence, and separately acquire game state information and game action information in each decision information pair;

a sample vector acquiring unit, configured to acquire a first feature vector corresponding to the game state information and a second feature vector corresponding to the game action information;

a sample vector concatenation unit, configured to perform concatenation processing on the first feature vector and the second feature vector to obtain a sample feature vector of the decision information pair; and a sample vector input unit, configured to sequentially input sample feature vectors of the decision information pairs in the training samples into the discriminator model according to the game sequence.

In some embodiments, the sample discrimination module may include:

an information pair quantity acquiring unit, configured to acquire an information pair quantity of decision information pairs in the training samples;

an information pair probability determining unit, configured to perform mapping processing on the sample feature vector of each decision information pair by using the discriminator model, to obtain an information pair classification probability of each decision information pair; and a sample probability determining unit, configured to: determine a sample classification probability of the training samples according to the information pair quantity and the information pair classification probability, and use the sample classification probability as the sample discrimination information.

In some embodiments, the parameter update module may include:

a function determining unit, configured to determine an objective function, the objective function including a user sample expectation corresponding to the user game sample and a model sample expectation corresponding to the model game sample; and a parameter update unit, configured to alternately update model parameters of the action model and the discriminator model according to the sample discrimination information and the objective function.

In some embodiments, the parameter update unit may include:

an action model update subunit, configured to: fix the model parameters of the action model, and update the model parameters of the discriminator model according to the sample discrimination information and the objective function, to increase a sample classification probability of the user game sample and reduce a sample classification probability of the model game sample; and a discriminator model update subunit, configured to: fix the model parameters of the discriminator model, and update the model parameters of the action model according to the sample discrimination information and the objective function, to increase the sample classification probability of the model game sample.

Details of the information processing apparatus provided in the embodiments of this application have been described in detail in corresponding method embodiments. Therefore, details are not described herein again.

Figure 12:
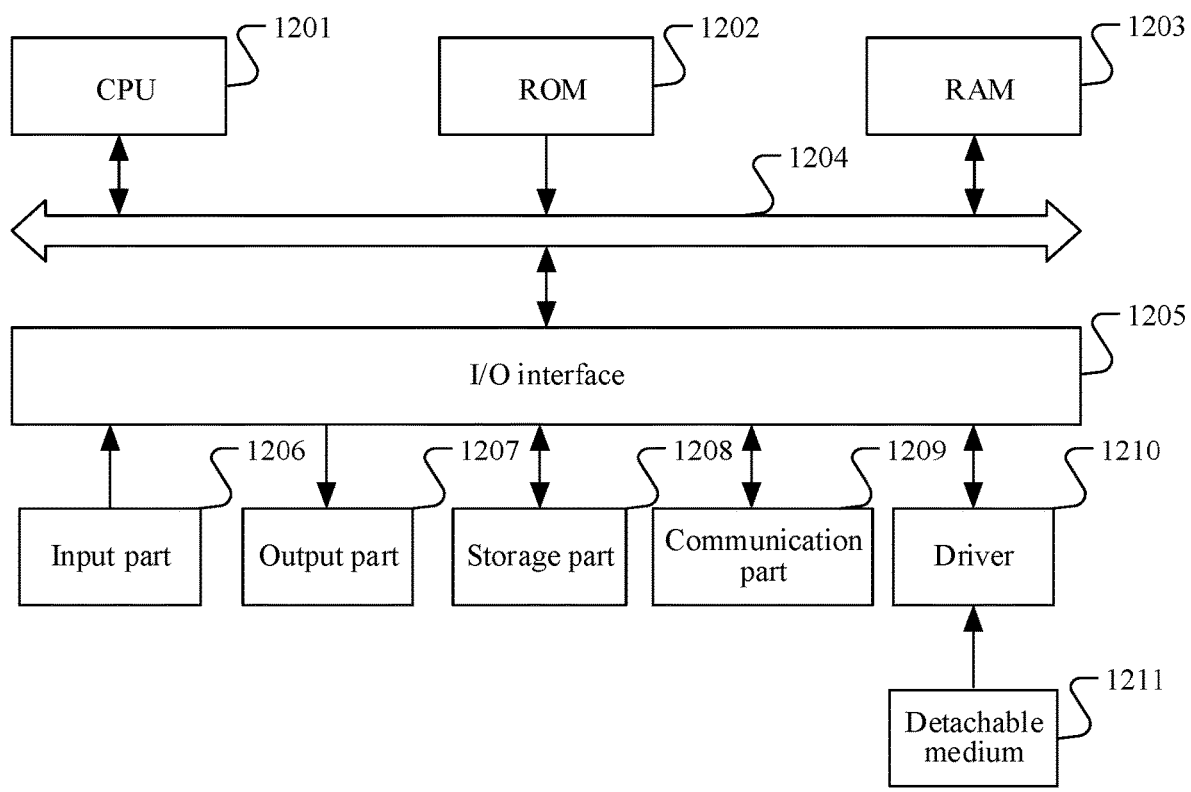
FIG. 12 is a schematic structural diagram of a computer system of an electronic device according to an embodiment of this application.

FIG. 12 is a schematic structural diagram of a computer system of an electronic device according to an embodiment of this application.

It is to be noted that, the computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which may perform various proper actions and processing based on a program stored in a read-only memory (ROM) 1202 or a program loaded from a storage part 1208 into a random access memory (RAM) 1203. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like, an output part 1207 including a cathode ray tube (CRT), a liquid crystal display (LCD), a speaker, or the like, a storage part 1208 including a hard disk, or the like, and a communication part 1209 including a network interface card such as a local area network (LAN) card or a modem. The communication portion 1209 performs communication processing by using a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable medium is installed into the storage part 1208 as required.

According to an embodiment of this application, the processes described above by referring to the flowcharts of each method may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from the network through the communication portion 1209, and/or installed from the removable medium 1211. When the computer program is executed by the CPU 1201, the various functions defined in the system of this application are executed.

It is to be noted that, the computer-readable storage medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. An example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the embodiments of this application, the computer-readable storage medium may be any tangible medium including or storing a program, and the program may be used by or in combination with an instruction execution system, apparatus or component. In the embodiments of this application, the computer-readable signal medium may include a data signal propagated in a baseband or as a part of a carrier, and stores computer-readable program code. The data signal propagated in such a way may assume a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the present disclosure, a person skilled in the art may easily conceive of other implementations of this application. This application is intended to cover any variations, uses or adaptive changes of this application following the general principles of this application, and includes the well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

INDUSTRIAL PRACTICABILITY

In the embodiments of this application, the electronic device determines a game action subject in a game scenario, and acquires an action model used for controlling the game action subject to execute a game action; performs feature extraction on the game scenario to obtain model game state information related to the game action subject; performs mapping processing on the model game state information by using the action model, to obtain model game action selection information corresponding to at least two candidate game actions; and selects, according to the model game action selection information, a model game action executed by the game action subject from the at least two candidate game actions. In this way, when game AI is configured in a game, a decision-making capability of the game AI can be greatly improved, so that the game AI has a higher personification effect and intelligence level, and game experience of a game user is greatly optimized.

What is claimed is:

1. An information processing method, comprising:
   determining, by a device comprising a memory storing instructions and a processor in communication with the memory, a subject in a game scenario, and acquiring an action model used for controlling the subject to execute a game action;
   performing, by the device, feature extraction on the game scenario to obtain model game state information related to the subject;
   performing, by the device, mapping processing on the model game state information by using the action model, to obtain model game action selection information corresponding to at least two candidate game actions;
   selecting, by the device according to the model game action selection information, a model game action for the subject from the at least two candidate game actions;
   combining the model game state information and the model game action information of the model game action into a model game sample;
   acquiring, by the device, user game data related to the subject, and determining, according to the user game data, a user game sample comprising user game state information and user game action information;
   using, by the device, the model game sample and the user game sample as training samples, and inputting the training samples into a discriminator model;
   performing, by the device, mapping processing on the training samples by using the discriminator model to obtain sample discrimination information, the sample discrimination information being used for discriminating whether the training samples are model game samples or user game samples; and
   updating, by the device, the action model and model parameters of the discriminator model according to the sample discrimination information.

2. The information processing method according to claim 1, wherein the performing feature extraction on the game scenario to obtain the model game state information related to the subject comprises:
   acquiring scenario state information in the game scenario and subject state information of the subject;
   performing feature extraction on the scenario state information to obtain a scenario feature vector, and performing feature extraction on the subject state information to obtain a subject feature vector; and
   performing concatenation processing on the scenario feature vector and the subject feature vector to obtain the model game state information related to the subject.

3. The information processing method according to claim 1, wherein the performing mapping processing on the model game state information by using the action model, to obtain the model game action selection information corresponding to the at least two candidate game actions comprises:
   determining the at least two candidate game actions related to the subject;
   performing mapping processing on the model game state information by using the action model, to obtain a selection probability of each candidate game action;
   acquiring available action state information of each candidate game action, and determining, according to the available action state information, action screening information corresponding to the candidate game action; and
   adjusting the selection probability of the candidate game action according to the action screening information, and using the adjusted selection probability as the model game action selection information.

4. The information processing method according to claim 3, wherein the adjusting the selection probability of the candidate game action according to the action screening information comprises:
   determining an action type of the candidate game action according to the action screening information, the action type comprising an available action and an unavailable action; and
   adjusting the selection probability of the candidate game action to a preset probability in a case that the action type of the candidate game action is an unavailable action.

5. The information processing method according to claim 1, wherein the selecting, according to the game action selection information, the model game action for the subject from the at least two candidate game actions comprises:
   separately determining a first probability of a random action selection policy and a second probability of a high probability action selection policy;
   determining, according to the first probability and the second probability, a model selection policy used for selecting the model game action;
   in response to the model selection policy being the random action selection policy, randomly selecting one candidate game action from the at least two candidate game actions as the model game action; and
   in response to the model selection policy being a high value action selection policy, selecting a candidate game action with a highest action value from the at least two candidate game actions as the model game action.

6. The information processing method according to claim 1, wherein the combining the model game state information and the model game action information of the model game action into the model game sample comprises:
   determining at least one game round in a game scenario, and acquiring game sequence information of each game round;
   combining the model game state information corresponding to a game round and the model game action information of the model game action into a model decision information pair; and
   combining the model decision information pair of each game round into a model decision information pair sequence according to the game sequence information, and using the model decision information pair sequence as the model game sample corresponding to the game scenario.

7. An information processing apparatus, comprising:
   a memory storing instructions; and
   a processor in communication with the memory, wherein, when the processor executes the instructions, the processor is configured to cause the information processing apparatus to perform:
      determining a subject in a game scenario, and acquiring an action model used for controlling the subject to execute a game action,
      performing feature extraction on the game scenario to obtain model game state information related to the subject,
      performing mapping processing on the model game state information by using the action model, to obtain model game action selection information corresponding to at least two candidate game actions,
      selecting, according to the model game action selection information, a model game action for the subject from the at least two candidate game actions,
      combining the model game state information and the model game action information of the model game action into a model game sample,
      acquiring user game data related to the subject, and determining, according to the user game data, a user game sample comprising user game state information and user game action information,
      using the model game sample and the user game sample as training samples, and inputting the training samples into a discriminator model,
      performing mapping processing on the training samples by using the discriminator model to obtain sample discrimination information, the sample discrimination information being used for discriminating whether the training samples are model game samples or user game samples, and
      updating the action model and model parameters of the discriminator model according to the sample discrimination information.

8. The information processing apparatus according to claim 7, wherein, when the processor is configured to cause the apparatus to perform feature extraction on the game scenario to obtain the model game state information related to the subject, the processor is configured to cause the information processing apparatus to perform:
   acquiring scenario state information in the game scenario and subject state information of the subject;
   performing feature extraction on the scenario state information to obtain a scenario feature vector, and performing feature extraction on the subject state information to obtain a subject feature vector; and
   performing concatenation processing on the scenario feature vector and the subject feature vector to obtain the model game state information related to the subject.

9. The information processing apparatus according to claim 7, wherein, when the processor is configured to cause the apparatus to perform mapping processing on the model game state information by using the action model, to obtain the model game action selection information corresponding to the at least two candidate game actions, the processor is configured to cause the information processing apparatus to perform:
   determining the at least two candidate game actions related to the subject;
   performing mapping processing on the model game state information by using the action model, to obtain a selection probability of each candidate game action;
   acquiring available action state information of each candidate game action, and determining, according to the available action state information, action screening information corresponding to the candidate game action; and
   adjusting the selection probability of the candidate game action according to the action screening information, and using the adjusted selection probability as the model game action selection information.

10. The information processing apparatus according to claim 9, wherein, when the processor is configured to cause the apparatus to perform adjusting the selection probability of the candidate game action according to the action screening information, the processor is configured to cause the information processing apparatus to perform:

determining an action type of the candidate game action according to the action screening information, the action type comprising an available action and an unavailable action; and adjusting the selection probability of the candidate game action to a preset probability in a case that the action type of the candidate game action is an unavailable action.

11. The information processing apparatus according to claim 7, wherein, when the processor is configured to cause the apparatus to perform selecting, according to the game action selection information, the model game action for the subject from the at least two candidate game actions, the processor is configured to cause the information processing apparatus to perform:

separately determining a first probability of a random action selection policy and a second probability of a high probability action selection policy;

determining, according to the first probability and the second probability, a model selection policy used for selecting the model game action;

in response to the model selection policy being the random action selection policy, randomly selecting one candidate game action from the at least two candidate game actions as the model game action; and in response to the model selection policy being a high value action selection policy, selecting a candidate game action with a highest action value from the at least two candidate game actions as the model game action.

12. The information processing apparatus according to claim 7, wherein, when the processor is configured to cause the apparatus to perform combining the model game state information and the model game action information of the model game action into the model game sample, the processor is configured to cause the information processing apparatus to perform:

determining at least one game round in a game scenario, and acquiring game sequence information of each game round;

combining the model game state information corresponding to a game round and the model game action information of the model game action into a model decision information pair; and combining the model decision information pair of each game round into a model decision information pair sequence according to the game sequence information, and using the model decision information pair sequence as the model game sample corresponding to the game scenario.

13. A non-transitory computer-readable storage medium storing computer-readable instructions, wherein, the computer-readable instructions, when executed by a processor, are configured to cause the processor to perform:

determining a subject in a game scenario, and acquiring an action model used for controlling the subject to execute a game action;

performing feature extraction on the game scenario to obtain model game state information related to the subject;

performing mapping processing on the model game state information by using the action model, to obtain model game action selection information corresponding to at least two candidate game actions;

selecting, according to the model game action selection information, a model game action for the subject from the at least two candidate game actions;

combining the model game state information and the model game action information of the model game action into a model game sample;

acquiring user game data related to the subject, and determining, according to the user game data, a user game sample comprising user game state information and user game action information;

using the model game sample and the user game sample as training samples, and inputting the training samples into a discriminator model;

performing mapping processing on the training samples by using the discriminator model to obtain sample discrimination information, the sample discrimination information being used for discriminating whether the training samples are model game samples or user game samples; and updating the action model and model parameters of the discriminator model according to the sample discrimination information.

14. The non-transitory computer-readable storage medium according to claim 13, wherein, when the computer-readable instructions are configured to cause the processor to perform feature extraction on the game scenario to obtain the model game state information related to the subject, the computer-readable instructions are configured to cause the processor to perform:

acquiring scenario state information in the game scenario and subject state information of the subject;

performing feature extraction on the scenario state information to obtain a scenario feature vector, and performing feature extraction on the subject state information to obtain a subject feature vector; and performing concatenation processing on the scenario feature vector and the subject feature vector to obtain the model game state information related to the subject.

15. The non-transitory computer-readable storage medium according to claim 13, wherein, when the computer-readable instructions are configured to cause the processor to perform mapping processing on the model game state information by using the action model, to obtain the model game action selection information corresponding to the at least two candidate game actions, the computer-readable instructions are configured to cause the processor to perform:

determining the at least two candidate game actions related to the subject;

performing mapping processing on the model game state information by using the action model, to obtain a selection probability of each candidate game action;

acquiring available action state information of each candidate game action, and determining, according to the available action state information, action screening information corresponding to the candidate game action; and adjusting the selection probability of the candidate game action according to the action screening information, and using the adjusted selection probability as the model game action selection information.

16. The non-transitory computer-readable storage medium according to claim 15, wherein, when the computer-readable instructions are configured to cause the processor to perform adjusting the selection probability of the candidate game action according to the action screening information, the computer-readable instructions are configured to cause the processor to perform:

determining an action type of the candidate game action according to the action screening information, the action type comprising an available action and an unavailable action; and adjusting the selection probability of the candidate game action to a preset probability in a case that the action type of the candidate game action is an unavailable action.

17. The non-transitory computer-readable storage medium according to claim 13, wherein, when the computer-readable instructions are configured to cause the processor to perform selecting, according to the game action selection information, the model game action for the subject from the at least two candidate game actions, the computer-readable instructions are configured to cause the processor to perform:

separately determining a first probability of a random action selection policy and a second probability of a high probability action selection policy;

determining, according to the first probability and the second probability, a model selection policy used for selecting the model game action;

in response to the model selection policy being the random action selection policy, randomly selecting one candidate game action from the at least two candidate game actions as the model game action; and in response to the model selection policy being a high value action selection policy, selecting a candidate game action with a highest action value from the at least two candidate game actions as the model game action.

* * * * *